United States Patent
Kim et al.

(10) Patent No.: US 12,188,616 B2
(45) Date of Patent: Jan. 7, 2025

(54) INSULATION SUPPORT AND LIQUID HYDROGEN STORAGE CONTAINER CONTAINING THE INSULATION SUPPORT FOR AUTOMOTIVE

(71) Applicant: DONGSUNG FINETEC CO., LTD., Anseong-si (KR)

(72) Inventors: Kabsoo Kim, Anseong-si (KR); Sungjung Kim, Anseong-si (KR); Sangwoo Won, Anseong-si (KR)

(73) Assignee: DONGSUNG FINETEC CO., LTD., Anseong-si (KR)

( * ) Notice: Subject to any disclaimer, the term of this patent is extended or adjusted under 35 U.S.C. 154(b) by 52 days.

(21) Appl. No.: 18/089,307

(22) Filed: Dec. 27, 2022

(65) Prior Publication Data
US 2023/0213146 A1 Jul. 6, 2023

(30) Foreign Application Priority Data
Dec. 31, 2021 (KR) .......... 10-2021-0193663

(51) Int. Cl.
*F17C 1/12* (2006.01)

(52) U.S. Cl.
CPC ........ *F17C 1/12* (2013.01); *F17C 2201/0109* (2013.01); *F17C 2203/014* (2013.01); *F17C 2203/0391* (2013.01); *F17C 2203/0629* (2013.01); *F17C 2203/0673* (2013.01); *F17C 2221/012* (2013.01); *F17C 2223/013* (2013.01); *F17C 2270/0178* (2013.01)

(58) Field of Classification Search
CPC ........... F17C 1/12; F17C 2201/0109; F17C 2203/014; F17C 2203/0391; F17C 2203/0629; F17C 2203/0673; F17C 2221/012; F17C 2223/013; F17C 2270/0178; F17C 3/08; F17C 3/02; F17C 3/04; F17C 13/001; F17C 2203/0304; F17C 3/085; F17C 2201/056; F17C 2203/0358; F17C 2203/0658; F17C 2270/0168; Y02E 60/32; B60K 15/03
See application file for complete search history.

(56) References Cited

U.S. PATENT DOCUMENTS

2006/0169704 A1* 8/2006 Brunnhofer ............... F17C 3/08
220/581

FOREIGN PATENT DOCUMENTS

DE 102021001008 A1 * 9/2021 ............... F17C 3/08
JP 2015105683 A 6/2015
(Continued)

OTHER PUBLICATIONS

Office Action dated Sep. 1, 2023 received in Korean Patent Application No. 10-2021-0193663, 11 pages.

*Primary Examiner* — Shawn M Braden
(74) *Attorney, Agent, or Firm* — Scully, Scott, Murphy & Presser, P.C.

(57) ABSTRACT

The present disclosure provides an insulation support that is disposed in a vacuum space between an inner container and an outer container of a liquid hydrogen storage container composed of the inner container and the outer container, and supports the inner container, in which the insulation support has a first end being in contact with the inner container and a second end being in contact with the outer container, and is bent several times into several layers; and an automotive liquid hydrogen storage container including the insulation support.

8 Claims, 9 Drawing Sheets

(56) References Cited

FOREIGN PATENT DOCUMENTS

| KR | 10-0937520 | B1 | 1/2010 |
| KR | 101572823 | B1 | 11/2015 |
| KR | 101974259 | B1 | 5/2019 |
| KR | 10-2021-0100675 | A | 8/2021 |

* cited by examiner heat
(a)

heat
(b)

INSULATION SUPPORT AND LIQUID HYDROGEN STORAGE CONTAINER CONTAINING THE INSULATION SUPPORT FOR AUTOMOTIVE

STATEMENT REGARDING FEDERALLY SPONSORED RESEARCH OR DEVELOPMENT

This invention was made with Government support under 1415176145 awarded by Ministry of Trade, Industry and Energy (South Korea). The Government may have certain rights to this invention.

TECHNICAL FIELD

The present disclosure relates to an insulation support for a liquid hydrogen storage container, and a liquid hydrogen storage container including the insulation support. Particularly, the present disclosure relates to an insulation support employing a composite material, and an automotive liquid hydrogen storage container including the insulation support.

BACKGROUND

Recently, energy demands have been continuously increasing due to rapid development of the industry and an increase in population, and accordingly, it is strongly required to supply substitute energy due to exhaustion of fossil fuel. Korea consumes a large amount of energy to the point where it ranks in the top 10 in the world in energy consumption, but it imports over 90% of its energy from other countries, so it is urgent to take measures in order to secure energy.

Accordingly, hydrogen fuel is considered substitute energy that is spotlighted to solve complicated energy problems that the whole world faces.

Hydrogen fuel is not only an abundant component next to carbon and nitrogen, but a clean energy source that does not discharge other air pollutants although it produces a very small amount of nitrogen oxides in burning. Further, hydrogen fuel can be produced from an abundant amount of water existing on the earth and is recycled into water after use, so it can be considered an optimal substitute energy source that is not likely to be exhausted.

The most important subject for using hydrogen fuel is a method of storing hydrogen, and there are a method of compressing and storing hydrogen fuel in a high-pressure gas cylinder, under the ground having geometric characteristics, or in a pipeline system, a solid adsorption method of using metal hydrides, carbon nanotubes, glass microspheres, etc., a method of storing hydrogen fuel in a liquefied state in a contained at an extremely low temperature, etc.

In particular, since hydrogen in a liquefied state is stored at an extremely low temperature, hydrogen vaporizes when a very small amount transfers from an external heat source due to conduction, convection, radiation, etc., and the loss rate due to such vaporization of hydrogen depends on the size and shape of containers and the types of insulation materials.

At present, a high-pressure hydrogen storage method that is used for vehicles generally does not require insulation, but a storage method that is excellent in terms of insulation is required to maintain −253° C. that is the temperature of liquid hydrogen.

A high-low pressure combined hydrogen fuel storage container for storing liquid hydrogen has been proposed in Korean Patent No. 0937520 (Patent Document 1) in the related art. Patent Document 1, as shown in FIG. 1, has a configuration in which an inner container 10 and the outer container 20 are included in a double structure, an insulator 30 for insulation is disposed between the inner container 10 and the outer container 20, and the outer container 20 has an injection port 40 for injecting hydrogen fuel and a vacuum port 50 for keeping the insides of the inner and outer containers 10 and 20 vacuum.

However, the hydrogen fuel storage container of Patent Document 1 has a structure supporting the center of a vertical type storage container, so there is a problem in that when the storage capacity increases and the weight and size increases or a thermal load increases, the container cannot be radially strongly supported. Further, the hydrogen fuel storage container of Patent Document 1 has a problem in that an insulation defect is generated in an internal attachment section due to the structure attached in the outer container 20 to support the inner container 10, so the insulation efficiency decreases.

As a related art related to a horizontal type liquid gas storage container such as an automotive liquid hydrogen storage container, a supporting device 15 for supporting a first inner tank 2 in a second outer tank 3 at one of longitudinal ends has been disclosed in Korean Patent Application Publication No. 10-2021-0100675 (Patent Document 2). As shown in FIG. 2, the supporting device 15 includes a rigid bridge extending and fixed in a longitudinal direction between an end of the outer tank 3 and an adjacent end of the inner tank 2. The supporting device 15 forms a horizontal mechanical bridge holding the first tank 2 in the second tank 3 in a cantilever type at a longitudinal end.

According to the horizontal type liquid gas storage tank of Patent Document 2, separate supporting rods 17 opposite to the supporting device 15 are removed, thereby removing an insulation defect that may be generated in an internal attachment section of the second tank 3 so that insulation of the tanks can be improved. However, the storage container of Patent Document 2, similar to Patent Document 1, has a structure supporting the center of the inner tank in the direction of the longitudinal center axis in a cantilever type, so there is a problem in that when the storage capacity increases and the weight and size increases or a thermal load increases, the container cannot be radially strongly supported.

Meanwhile, supports made of composite materials such as fiber reinforced plastic (FRP) were used to reduce an insulation defect of supports coupled between an outer tank and an inner tank of a liquid gas storage container and supporting the tanks. Supports have excellent heat-retaining performance in comparison to metallic supports, but a technology having higher insulation performance is required.

PRIOR ART DOCUMENT

Patent Document (Patent Document 1) Korean Patent No. 10-0937520 (publication date: 2010 Jan. 19)
(Patent Document 2) Korean Patent Application Publication No. 10-2021-0100675 (publication date: 2021 Aug. 17)

SUMMARY

The present disclosure has been made in an effort to solve the problems of the related art described above and an objective of the present disclosure is to provide an insulation support having excellent insulation performance to maintain the temperature of liquid hydrogen, and an automotive liquid hydrogen storage container including the insulation support.

Another objective of the present disclosure is to provide an insulation support for a liquid hydrogen storage container that has a structure being able to safely support a container against a load due to weight when a weight and a size are increased to increase storage capacity, and a thermal load due to thermal deformation, preferably, an insulation support for an automotive liquid hydrogen storage container, and an automotive liquid hydrogen storage container including the insulation support.

Another objective of the present disclosure is to provide an insulation support for a liquid hydrogen storage container that has a structure being able to absorb thermal deformation of a storage container, preferably, an insulation support for an automotive liquid hydrogen storage container, and an automotive liquid hydrogen storage container including the insulation support.

An insulation support according to an embodiment of the present disclosure for achieving the objectives is disposed in a vacuum space between an inner container and an outer container of a liquid hydrogen storage container composed of the inner container and the outer container, and supports the inner container, and may have a first end being in contact with the inner container and a second end being in contact with the outer container and may be bent several times into several layers.

Further, the insulation support may be made of a composite material including a resin material and a reinforced fiber.

Further, gaps between the layers are vacuums.

Further, a cavity may be formed at a center area.

Further, gaps between adjacent layers overlapped may be filled with a filler.

Further, the insulation support may include a plurality of insulation supports installed in a circumferential direction of the inner container.

Further, an automotive liquid hydrogen storage container according to an embodiment of the present disclosure may include the insulation support.

Further, in the liquid hydrogen storage container, an end of the inner container of the liquid hydrogen storage container is fixed to the outer container.

Further, in the liquid hydrogen storage container, an opposite end of the inner container of the liquid hydrogen storage container may not be fixed to be able to move longitudinally.

ADVANTAGEOUS EFFECTS

The insulation support for a liquid hydrogen storage container according to the present disclosure and the automotive liquid hydrogen storage container including the insulation support have an effect that insulation performance for maintaining the temperature of liquid hydrogen is very excellent.

Further, the insulation support has an effect that it can safely support a container against a load due to weight when weight and a size are increased to increase storage capacity, and a thermal load due to thermal deformation when weight and a size are increased to increase storage capacity.

Further, the insulation support can provide a structure that can absorb thermal deformation of a storage container when a thermal load is applied.

DETAILED DESCRIPTION

Hereafter, an automotive liquid hydrogen storage container according to the present disclosure is described in detail with reference to FIGS. 3 to 9.

Figure 1:
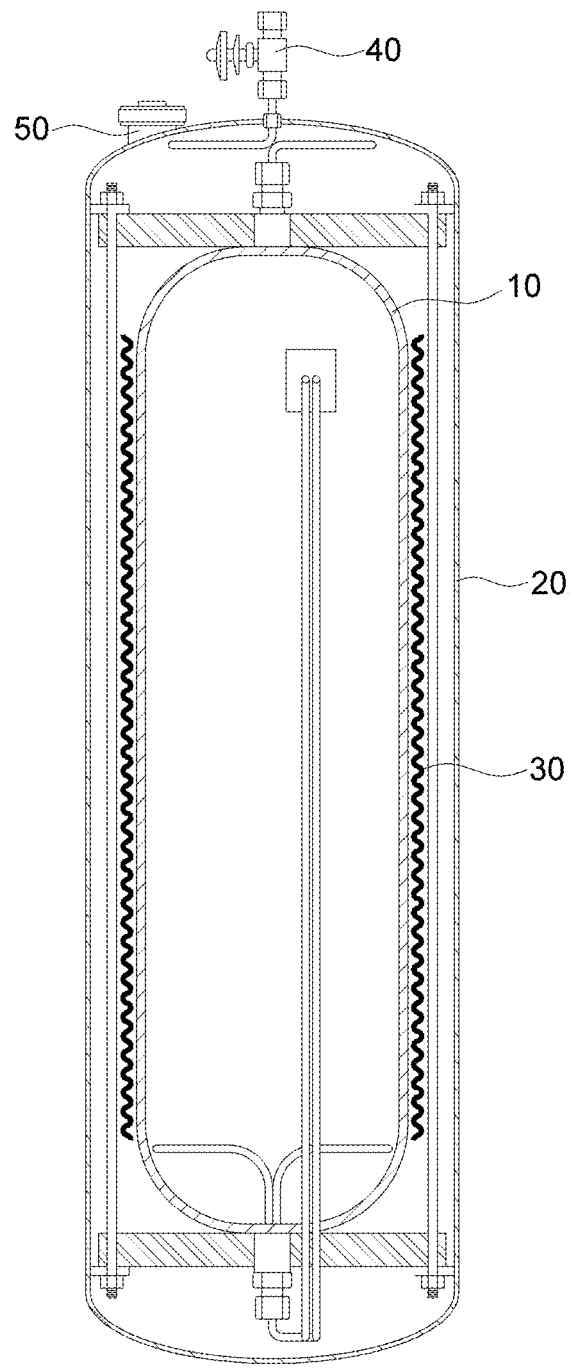
FIG. 1 is a view showing a vertical type hydrogen fuel storage container of the related art.
Figure 2:
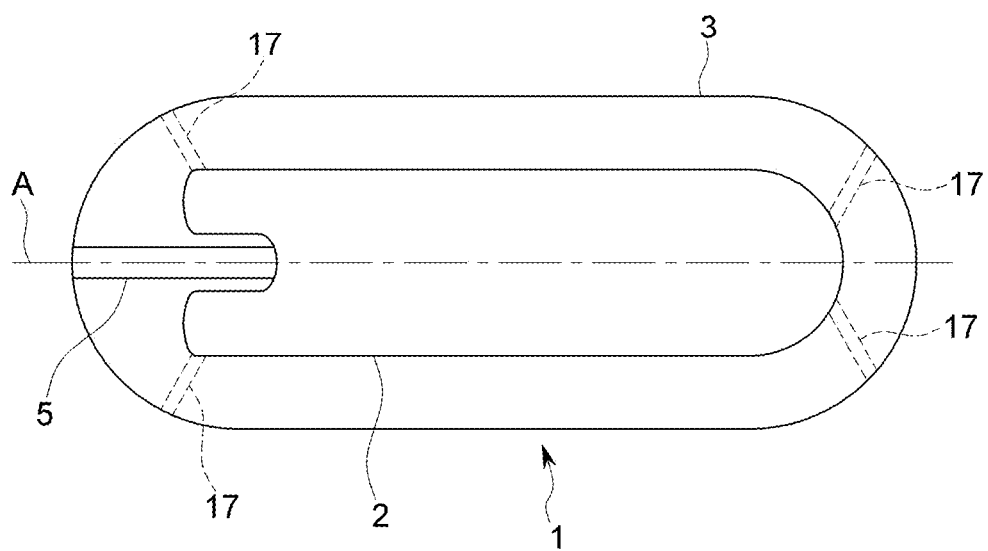
FIG. 2 is a view showing a horizontal type hydrogen fuel storage container of the related art.
Figure 3:
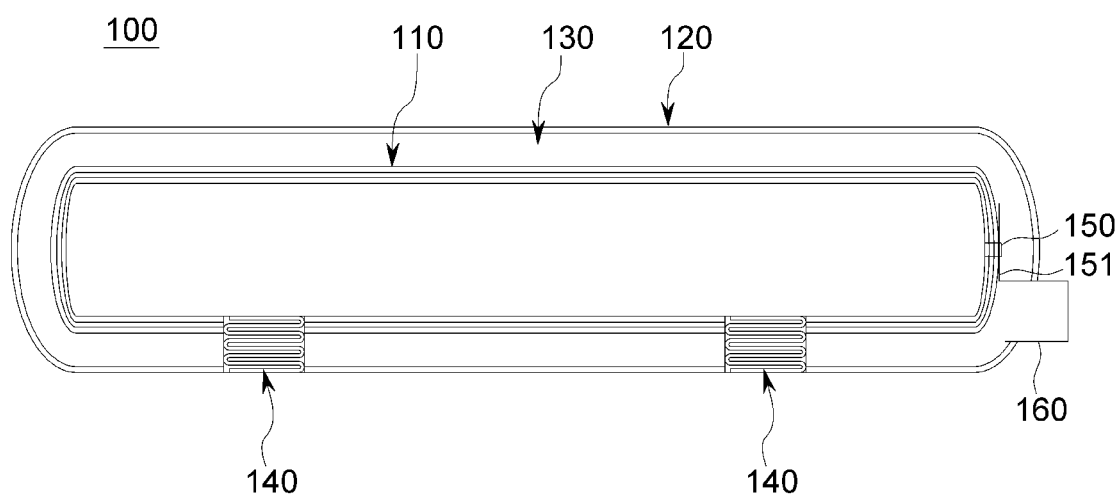
FIG. 3 is a view showing an automotive liquid hydrogen storage container according to an embodiment of the present disclosure.
Figure 4:
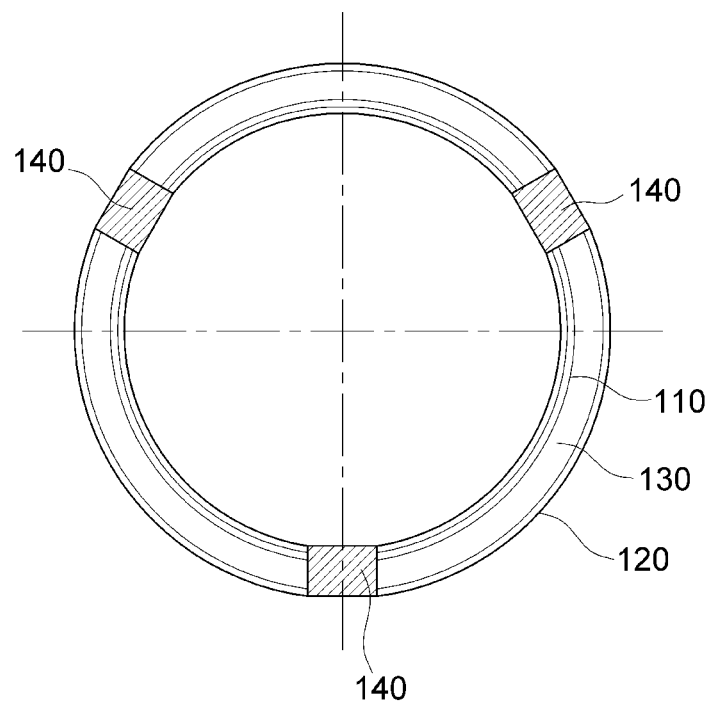
FIG. 4 is a view showing a side cross-section of the storage container of FIG. 3.

FIG. 3 shows an automotive liquid hydrogen storage container according to an embodiment of the present disclosure, and FIG. 4 shows a side cross-section of the storage container of FIG. 3.

An automotive liquid hydrogen storage container according to an embodiment of the present disclosure is a horizontal type storage container and has a double structure composed of an inner container 110 storing liquid hydrogen and an outer container 120 surrounding and accommodating the inner container 110.

An injection port (not shown) for injecting hydrogen fuel is installed on the outer container 120, and a vacuum nozzle 160 for vacuuming a gap space 130 between the inner container 110 and the outer container 120 is installed at an end of the outer container 120.

An end of the longitudinal ends of the inner container 110, where the vacuum nozzle 160 is installed, is fixed to the outer container 120 by a fixed member 150 and a fixed frame 151 connected to the fixed member 150. The opposite end of the inner container 110 is not fixed, so the opposite end can longitudinally freely move when a thermal load is applied.

An insulation support 140 for supporting the inner container 110 is installed between the inner container 110 and the outer container 120. The insulation support has an end being in contact with the inner container 110 and the other end being in contact with the outer container 120.

The insulation support 140 is made of a composite material having excellent insulation performance, so the insulation support 140 minimizes heat transfer from the outside to maintain the temperature of −253° C. of the liquid hydrogen stored in the inner container 110.

The insulation support 140 is made of a composite material containing resin and is composed of several layers overlapping each other, so when the inner container 110 is moved longitudinally (to the left in FIG. 3) by thermal deformation, the inner container 110 can slide while being supported by the insulation support 140. That is, even though the inner container 110 is thermally deformed by a thermal load, the thermal deformation can be absorbed, so durability is improved.

The insulation support 140, as shown in FIG. 4, is installed through the gap space 130 between the inner container 110 and the outer container 120, and it is preferable that a plurality of insulation supports 140 is circumferentially installed to function as a firm support in the radial direction of the storage container 100. When the capacity required for the storage container is increased or the weight is increased, it is possible to firmly support the increased capacity and weight by circumferentially installing a plurality of insulation supports 140. The embodiment of FIG. 4 shows an example in which three insulation supports 140 are installed with regular intervals.

Figure 5:
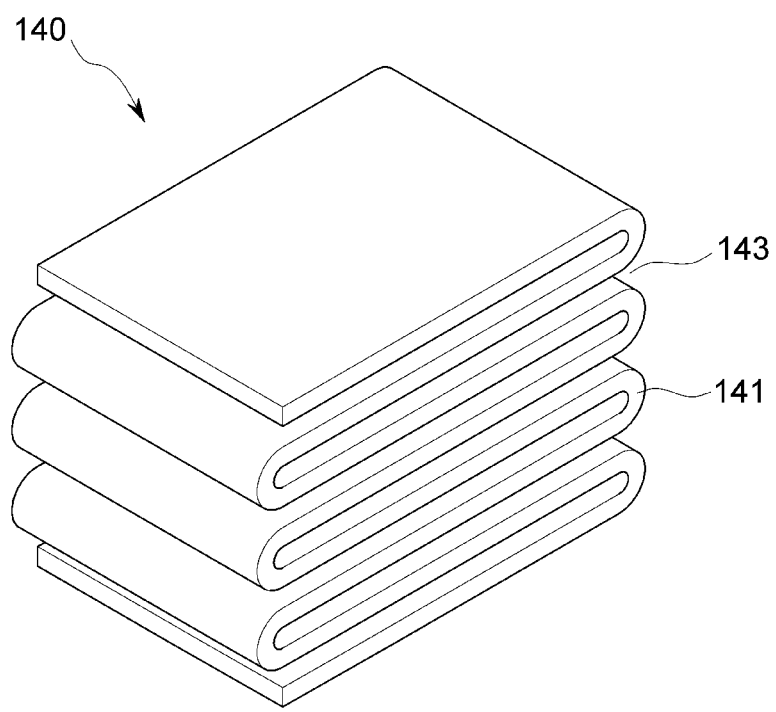
FIG. 5 is a view showing the structure of an insulation support that is installed in the storage container of FIG. 3 and FIG. 4.
Figure 6:
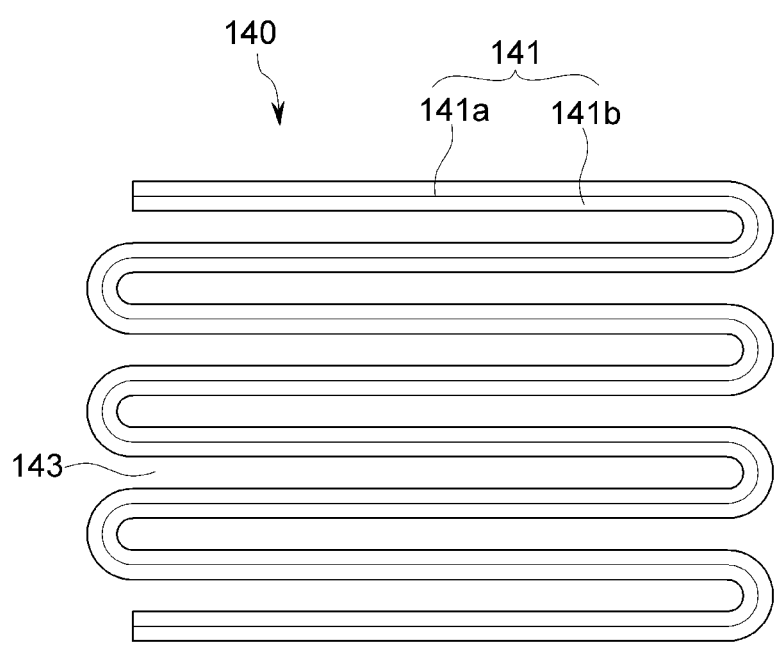
FIG. 6 is a view showing a cross-section of the insulation support of FIG. 5.
Figure 7:
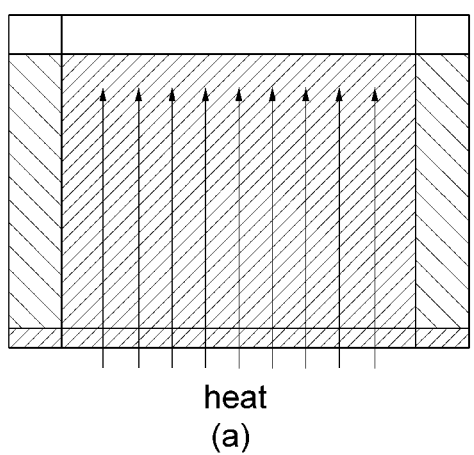
FIG. 7 is a view for comparing insulation performance of an insulation support for an automotive liquid hydrogen storage container according to the present disclosure and an insulation support of the related art.
Figure 7:
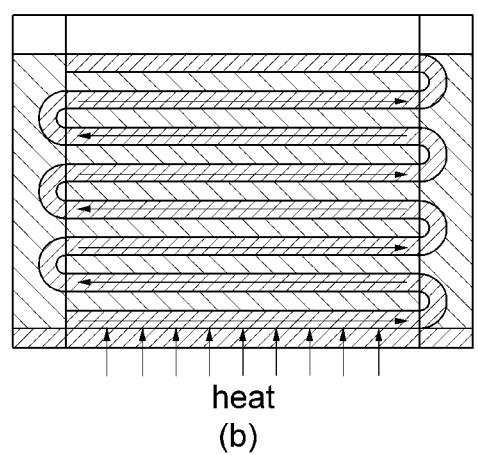

FIG. 5 shows the structure of the insulation support 140 installed in the storage container of FIG. 3 and FIG. 4, and FIG. 6 shows a cross-section of the insulation support of FIG. 5.

The insulation support 140 is made of a composite material including a resin material 141b and a reinforced fiber 141a. Two or more of reinforce fibers may be included in the composite material. The composite material may be fabricated by impregnating the resin material 141b with the reinforced fiber 141a. The insulation support 140, as shown in FIG. 5 and FIG. 6, is bent several times into several layers. The reinforced fiber 141a impregnated in the composite material may be a long fiber or a short fiber. Since the insulation support 140 made of this composite material has high strength and insulation function, the insulation support 140 has strength that is enough to support the inner container 110 in the outer container 120 of the storage container 100, and also can perform an insulation function that can minimize heat transfer from the outside.

The insulation support 140 is formed by folding a composite material body 141 in several layers, and a gap 143 exists between each two adjacent layers overlapped. The insulation support 140 is installed and compressed in the gap space 130 between the inner container 110 and the outer container 120, and can sufficiently support the inner container 110 in this state. Since the insulation support 140 is composed of several overlapping layers, even though the inner container 110 is moved longitudinally by a thermal load, the insulation support 140 can absorb the thermal deformation.

Hereafter, the insulation performance of the insulation support 140 is described in detail.

In a liquid hydrogen storage container composed of an inner container accommodating liquid hydrogen and an outer container surrounding the inner container, the space between the inner container and the outer container is made to be a vacuum for vacuum insulation. A support that can maintain a predetermined distance between the inner container and the outer container is required for vacuum insulation in the liquid hydrogen storage container.

In a liquid hydrogen storage container, the temperature of an inner container drops to −253° C., that is the temperature of liquid hydrogen, so there is limit in satisfying both strength and insulation performance using wooden supports that are generally used for LNG tanks.

As a support having excellent strength and insulation performance under an extremely low-temperature environment such as the inside of a liquid hydrogen storage container, a support made of a composite material such as fiber reinforced plastic (FRP) can be used.

Although depending on the kinds of fibers and matrix resin, the thermal conductivity of fiber reinforced plastic (FRP) is about 0.3 W/mK. However, when a composite material structure formed by folding a fiber reinforced plastic (FRP) material in several layers like the insulation support 140 according to the present disclosure is in a vacuum state, although depending on the vacuum state, there is a difference of 4.6 million times in comparison to fiber reinforced plastic (FRP) when the composite material structure has thermal conductivity of $6.5 \times 10^{-8}$ W/mK in a vacuum environment at $10^{-3}$ Torr.

That is, as for a support made of a fiber reinforced plastic material in the related art, as shown in FIG. 7A, when heat permeates into a storage tank from the outside, the heat quickly transfers along a short straight path (in the direction of an arrow) toward an inner container in an extremely low-temperature environment through a rigid support made of fiber reinforced plastic having thermal conductivity of about 0.3 W/mK, so the amount of heat permeation per unit time increases, which decreases heat-retaining performance.

However, as shown in FIG. 7B, according to a support having a composite material structure formed by folding a fiber reinforced plastic (FRP) material in several layers, the speed of heat transferring along the layers of the composite material is higher than the speed of heat transferring through the vacuum between the layers, so heat transfers along a zigzag path (in the direction of arrows). That is, heat transfers along a long path, so the amount of heat permeation per unit time is small, whereby heat-retaining performance is remarkably improved.

Figure 8:
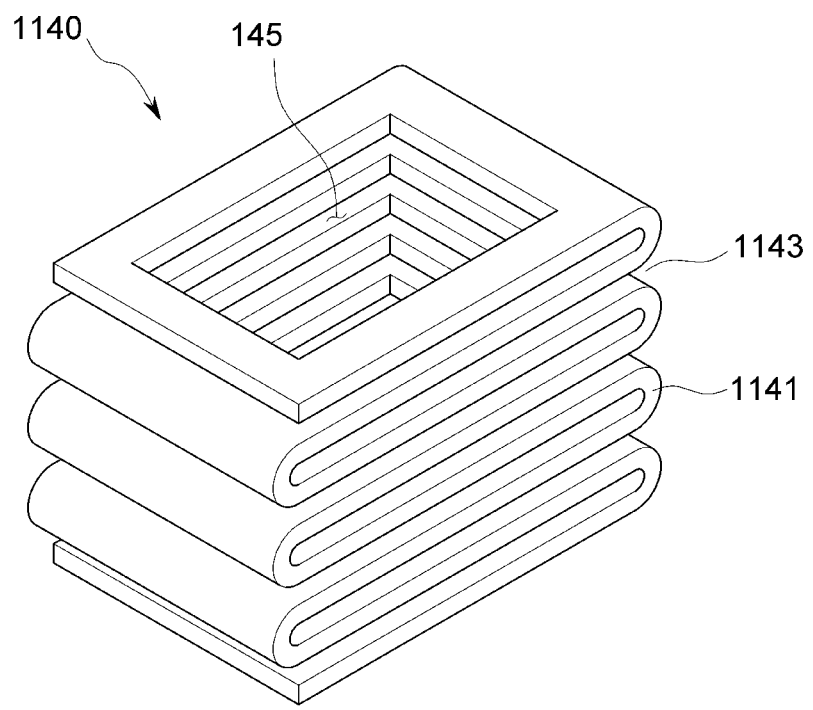
FIG. 8 is a view showing another embodiment of the insulation support that is installed in the automotive liquid hydrogen storage container according to the present disclosure.

FIG. 8 shows another embodiment of the insulation support that is installed in the automotive liquid hydrogen storage container according to the present disclosure. In this embodiment, an insulation support 1140 is formed by folding a composite material body 1141 into several layers, a gap 1143 exists between the overlaps, and a cavity 145 is formed at the center area in the insulation support 1140. The size or shape of the cavity 145 is not limited as long as the insulation support 1140 has a supporting force that is enough to support the inner container 110.

In comparison to the support made of a composite material rigid body shown in FIG. 7A, the insulation performance of the insulation support 140 of the embodiment shown in FIG. 7B (the same as FIG. 5 and FIG. 6) according to the present disclosure and the insulation support 1140 of the embodiment shown in FIG. 8 were checked through numerical analysis and the result is as follows.

That is, as the result of performing finite element analysis using an ANSYS numerical analysis program, heat flux of the support made of a composite material rigid body of the related art shown in FIG. 7A was 735.17 W/m², heat flux of the insulation support 140 of the embodiment shown in FIG. 7B (FIG. 5 and FIG. 6) was 6.10 W/m², and heat flux of the insulation support 1140 of the embodiment shown in FIG. 5 was 3.31 W/m². Comparing the heat fluxes of the cases on the basis of the numerical analysis result, it could be seen that the insulation efficiency of the insulation supports 140 and 1140 according to the present disclosure was improved about 120~220 times in comparison to the composite material support of the related art.

Figure 9:
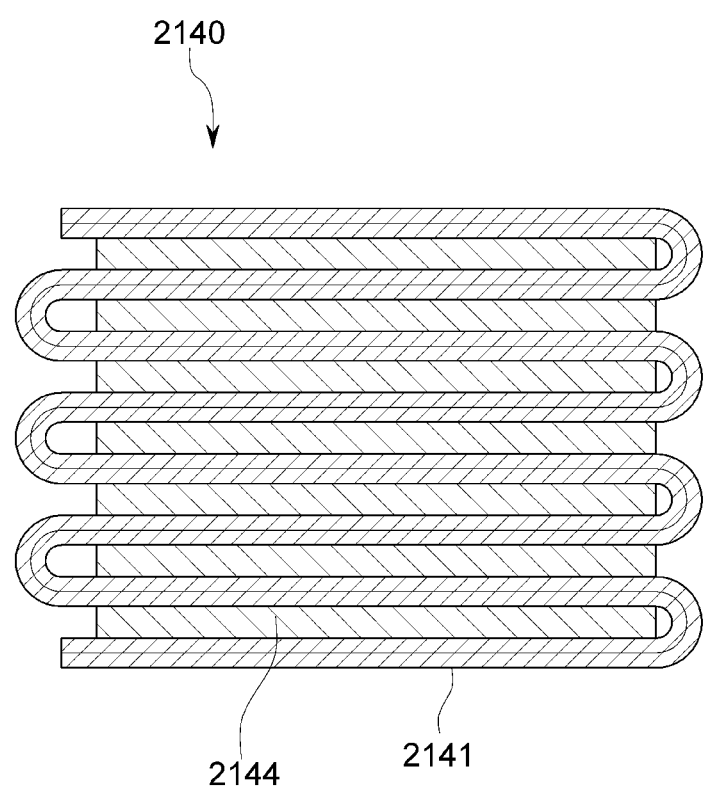
FIG. 9 is a view showing another embodiment of the insulation support that is installed in the automotive liquid hydrogen storage container according to the present disclosure.

FIG. 9 shows another embodiment of the insulation support that is installed in the automotive liquid hydrogen storage container according to the present disclosure.

In this embodiment, an insulation support 2140 is formed by folding a composite material body 2141 into several layers and the gaps of the overlaps are filled with a filler 2144. In the insulation support 140 according to the embodiment shown in FIG. 5 and FIG. 6, since there are gaps 143, so the insulation support 140 is compressed by weight and the thickness thereof can be decreased, but when the gaps 143 are filled with the filler 2144, reduction of the thickness of the insulation support 140 is decreased, so the supporting force can be improved. Further, since the gaps are filled with the filler 2144, it is possible to secure mechanical strength at an ultra low temperature.

It is preferable that the filler 2144 is made of a material that can minimize heat transfer due to conduction and radiation. For example, it is preferable that the filler 2144 is formed by stacking a glass paper or a glass net and a thin-film Al-file into several layers to be able to perform also an insulation function. More preferably, the thickness of the filler 2144 is set in a range similar to the size of the gaps 143, whereby structural stability can be increased.

The above description merely explains the spirit of the present disclosure and the present disclosure may be changed, modified, and replaced in various ways without departing from the spirit of the present disclosure by those skilled in the art. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the patent right of the present disclosure.

DETAILED DESCRIPTION OF MAIN ELEMENTS

100: storage container
110: inner container
120: outer container
130: gap space
140, 1140, 2140: insulation support
141, 1141, 2141: composite material body
141*a*: reinforced fiber
141*b*: resin material
143, 1143: gap
145: cavity
150: fixed member
160: vacuum nozzle
2144: filler

What is claimed is:

1. An insulation support that is disposed in a vacuum space between an inner container and an outer container of a liquid hydrogen storage container composed of the inner container and the outer container, and supports the inner container, wherein the insulation support has an end being in contact with the inner container and the other end being in contact with the outer container, and is bent several times into several layers,
a cavity is formed at the center area in the insulation support.

2. The insulation support of claim 1, wherein the insulation support is made of a composite material including a resin material and reinforced fiber.

3. The insulation support of claim 2, wherein gaps between the layers are vacuums.

4. The insulation support of claim 1, wherein gaps between the adjacent layers overlapped are filled with a filler.

5. The insulation support of claim 4, configured to be installed in plural in a circumferential direction of the inner container.

6. An automotive liquid hydrogen storage container including the insulation support of claim 1.

7. The automotive liquid hydrogen storage container of claim 6, wherein an end of the inner container is fixed to the outer container.

8. The automotive liquid hydrogen storage container of claim 7, wherein an opposite end of the inner container of the liquid hydrogen storage container is not fixed to be able to move longitudinally.

\* \* \* \* \*